United States Patent Office.

FERDINAND LEROY, ADMINISTRATOR, AND P. A. VICTOR LE LUBEZ, ASSIGNEE OF FERDINAND LEROY, DECEASED, OF LONDON, ENGLAND.

*Letters Patent No.* 97,781, *dated December* 14, 1869; *reissue No.* 4,095, *dated August* 9, 1870.

IMPROVEMENT IN COMPOSITION FOR COVERING STEAM-BOILERS AND FOR OTHER PURPOSES.

The Schedule referred to in these Letters Patent and making part of the same

*To all whom it may concern:*

Be it known that FERDINAND LEROY, deceased, late of Commercial Road, London, England, did in his lifetime invent a new and useful improved Composition for Covering Steam-Boilers and for other purposes, of which the following is a full, clear, and exact description.

The object of the said FERDINAND LEROY, deceased, was the production of an improved non-conducting composition, suitable, as a cement, for coating steam-boilers, or other surfaces, to prevent the radiation of heat from or conduction of heat into the surfaces coated therewith.

The said improved composition can be used as a substitute for mortar and cement in building or stopping up boilers or other steam-receivers with bricks; also, for coating steam-boilers, locomotives, cylinders, steam-pipes, charcoal filters, and other steam-receivers and apparatus of any kind, where it is required to prevent the radiation of heat.

It may also be used for coating pumps, cylinders, pipes, and other utensils and apparatus for containing and conveying water and other liquids and beverages requiring to be protected from the external air, intense cold, and frost.

The improved non-conducting composition is prepared by mixing and combining brick-clay with powdered charcoal, sawdust, fuel sweepings, cow-hair, cocoa-nut fiber, wheaten flour, yeast, or other fermentable substance, residues from the conversion of starch into sugar, and cotton-foot oil, in the following manner:

In a vessel of suitable form and size, furnished with a stirring apparatus, place about one hundred and twelve parts, in weight, of brick-clay, seventy parts, in weight, of powdered charcoal, twenty-eight parts, in weight, of sawdust, twenty-eight parts, in weight, of fuel sweepings, eight parts, in weight, of cow-hair, eight parts, in weight, of cocoa-nut fiber, two parts, in weight, of wheaten flour, yeast, or other fermentable substance, eight parts, in weight, of the residues from the conversion of starch into sugar, eighty parts, in weight, of water, and thirty-six parts, in weight, of cotton-foot oil.

The stirring apparatus is then put in motion, and as soon as these substances are well mixed and combined into a paste or mortar, put the composition into a fermenting vat, and submit it to a certain temperature so as to cause fermentation, the result of which is a homogeneous self-adhesive substance, which is then ready to be used for the purposes hereinbefore described.

About 70° Fahrenheit will answer if yeast be used.

For covering marine and locomotive boilers, the fronts of horizontal boilers, and flat upright surfaces, use, at certain distances between the first and second inch of the composition, hoop-iron, fastened at each end with screws.

The object of this hoop-iron is to secure the equal adhesion of the composition, the hoop-iron undergoing the same expansion and contraction as the iron of the boiler.

The best results will be obtained if all the ingredients in the proportions above specified be used, but good results can be obtained by the omission of some of them; as, for instance, the cow-hair, or the cocoa-nut fiber, may be omitted, and other equivalent fibrous matter be substituted for either or both of them. Yeast may be dispensed with if some other equivalent suitable fermentable substance be substituted, as the sole object is to induce fermentation after the admixture of the ingredients.

Fuel sweepings and the residues from the conversion of starch into sugar may be omitted, and any other equivalent matter may be submitted for cotton-foot oil.

What is claimed as the invention of the said FERDINAND LEROY, deceased, is—

The composition of matter, substantially as hereinabove described, as a non-conducting cement, suitable for coating surfaces, to prevent the radiation of heat from or conduction to surfaces coated therewith, as set forth.

Also, the preparation of the same by fermentation, substantially as described.

Also, the method of applying the same in more than one coat, with hoop-iron, or equivalent, interposed between the coats and secured to the surface coated, as set forth.

FERDINAND LEROY,
*Administrator of the Estate of Ferd. Leroy, deceased.*
P. A. VICTOR LE LUBEZ.

Witnesses:
J. H. RICHARDSON,
THOMAS ELSON.